United States Patent [19]

Schule

[11] Patent Number: 4,906,148
[45] Date of Patent: Mar. 6, 1990

[54] FIXING ASSEMBLY FOR A FLAT ROOF STRUCTURE AND FIXING DEVICE FOR USE THEREIN

[76] Inventor: Siegfried Schule, Schwalbenstrasse 9, 6078 Neu-Isenburg 2, Fed. Rep. of Germany

[21] Appl. No.: 310,006

[22] Filed: Feb. 10, 1989

Related U.S. Application Data

[63] Continuation of Ser. No. 21,278, Mar. 3, 1987, abandoned.

[30] Foreign Application Priority Data

Mar. 7, 1986 [DE] Fed. Rep. of Germany ....... 3607607

[51] Int. Cl.$^4$ .............................................. F16B 13/04
[52] U.S. Cl. ......................................... 411/34; 411/44; 411/55; 411/908
[58] Field of Search ............................... 411/34-38, 411/43-45, 57, 55, 908, 15, 60, 71, 32; 52/410, 512

[56] References Cited

U.S. PATENT DOCUMENTS

| | | | |
|---|---|---|---|
| 633,537 | 9/1899 | Stewart | 411/34 X |
| 2,277,885 | 3/1942 | Rodanet | 411/34 |
| 2,326,866 | 8/1943 | Kincaid, Jr. | 411/34 X |
| 2,365,372 | 12/1944 | Allen | 411/34 X |
| 2,456,480 | 12/1948 | Austin | 411/34 X |
| 2,927,495 | 3/1960 | Barwood | 411/82 X |
| 3,013,643 | 12/1961 | Perry | 411/34 X |
| 3,021,927 | 2/1962 | McKee, Jr. | 411/34 X |
| 3,053,046 | 9/1962 | Fleming, Jr. | 411/60 |
| 3,082,578 | 3/1963 | Lindstaedt et al. | 411/15 X |
| 3,093,026 | 6/1963 | Mills et al. | 411/34 |
| 3,311,012 | 3/1967 | Williams | 411/15 |
| 3,492,909 | 2/1970 | Triplett | 411/34 |
| 3,651,651 | 3/1972 | Triplett | 411/34 |
| 4,108,043 | 8/1978 | Varga | 411/34 |
| 4,451,189 | 5/1984 | Pratt | 411/43 X |
| 4,457,652 | 7/1984 | Pratt | 411/38 |
| 4,659,268 | 4/1987 | Del Mundo et al. | 411/34 |
| 4,678,383 | 7/1987 | Bergner | 411/57 X |
| 4,708,551 | 11/1987 | Richter et al. | 411/57 X |
| 4,730,966 | 3/1988 | Schiefer | 411/55 |
| 4,834,600 | 5/1989 | Lemke | 411/55 |

FOREIGN PATENT DOCUMENTS

| | | | |
|---|---|---|---|
| 465234 | 8/1951 | Italy | 411/34 |
| 697274 | 9/1953 | United Kingdom | 411/257 |

Primary Examiner—Gary L. Smith
Assistant Examiner—Suzanne L. Dino
Attorney, Agent, or Firm—Pollock, Vande Sande & Priddy

[57] ABSTRACT

A fixing device for use in fixing insulating boards and waterproof sheeting, if required, to be fixed with the insulating boards on a sheet panel forming a cover plate for a flat roof, includes a sleeve inserted into a drilled hole extending through the waterproof sheeting, the insulating board, and the sheet panel, the lower end of the sleeve projecting beyond the sheet panel and including an expandable part which is opened out beyond the drilled hole diameter by tightening a nut on a bolt which passes through a plate or disc-like abutment element and the bore of the sleeve. The fixing device is made such that it can be detached again so that the roof covering can be repaired, renewed, and reconstructed, if required, without causing significant damage to the sheet panel.

17 Claims, 5 Drawing Sheets

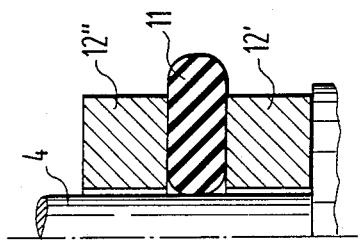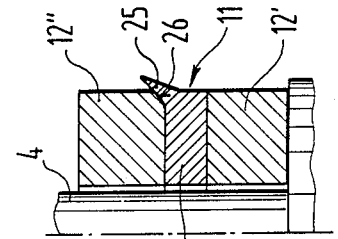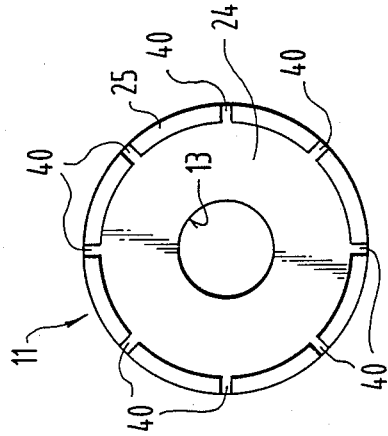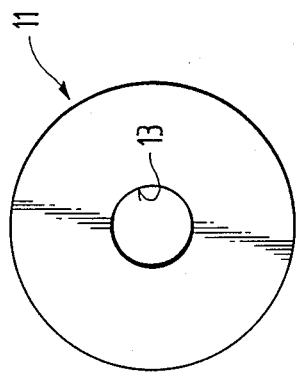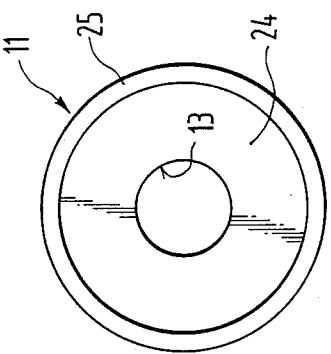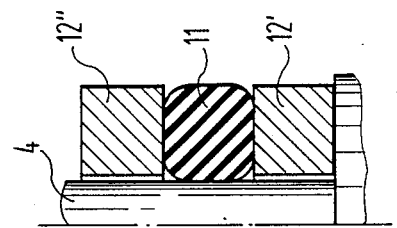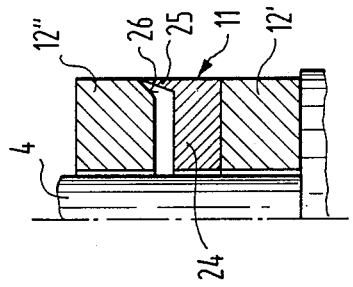

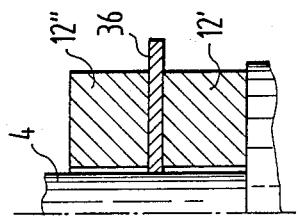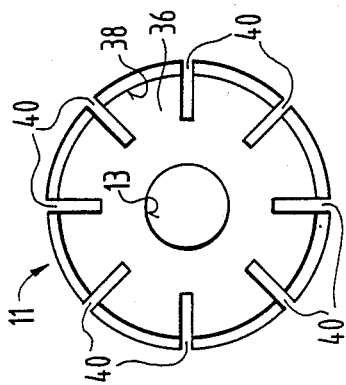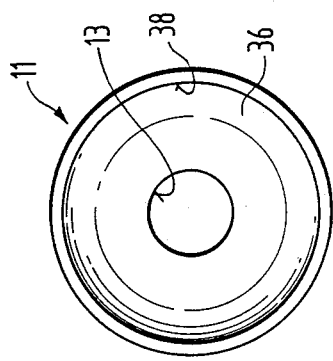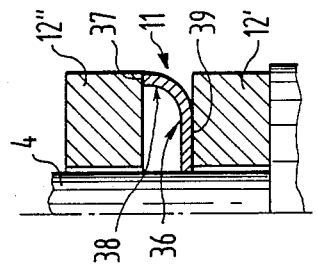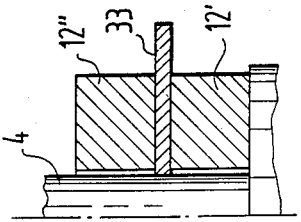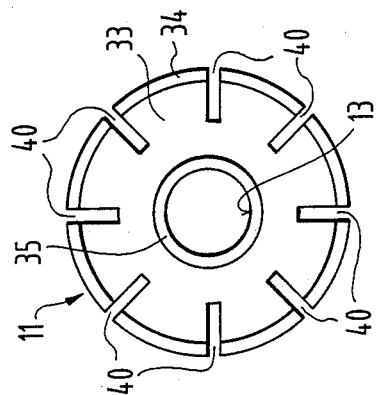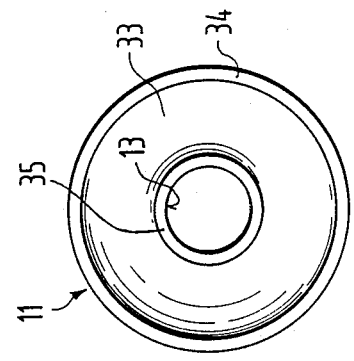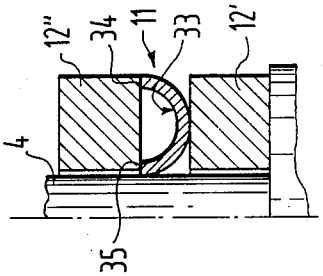

FIXING ASSEMBLY FOR A FLAT ROOF STRUCTURE AND FIXING DEVICE FOR USE THEREIN

This application is a continuation, of Ser. No 021,278, filed on Mar. 3, 1987, now abandoned.

BACKGROUND OF THE INVENTION

1. Field of the Invention

This invention relates to fixings for flat roof structures. More particularly the invention concerns the fixing of insulating boards and waterproof sheeting, if required to be fixed with the insulating boards, on a sheet panel forming a cover plate for a flat roof.

2. Description of the related Art

A known form of fixing employs a sleeve which is inserted into a drilled hole leading through the waterproof sheeting, if included, the insulating board and the sheet panel. The lower end of the sleeve projects beyond the sheet panel and includes a part which is expandable so that its outside diameter becomes larger than the drilled hole diameter. This part of the sleeve is expanded by tightening a clamping means which extends through a plate-like or disc-like element and the bore of the sleeve.

A fixing of this form is disclosed in German Utility Model 7,818,691, and consists of a blind rivet, a spacing or distance sleeve and a washer. It is used for fixing insulating boards on a flat, corrugated, meander shaped or trapezoidal sheet panels in roof and wall constructions. The distance sleeve is supported on the inside of the sheet panel and against the underside of a plate-shaped or disc-shaped element which rests on the upper side of the uppermost waterproof sheeting or insulating board, and a blind rivet is used as the clamping and sleeve expanding means. The blind rivet normally consists of a rivet sleeve and rivet pin. By clamping the rivet pin, the rivet-sleeve which projects through the drilled hole in the sheet panel opens out and forms a rivet head for engaging behind the sheet panel.

The length of the blind rivet and especially the length of the distance piece must be adapted to the thickness of the insulating board(s) and possible waterproof sheetings; that is, a certain embodiment of this known fixing device can only be used for a given spacing between the sheet panel and the disc-shaped element, or in other words for a specific thickness of insulating board, including the cover plate for the flat roof. It is also a disadvantage that this known fixing cannot be easily detached again. Therefore, it is desirable for renovation and/or maintenance purpose to provide a fixing device which can be removed so that the less durable insulating and sealing material can be removed and replaced without damaging the sheet panel.

SUMMARY OF THE INVENTION

The present invention has for an object to provide a fixing assembly for securing insulating boards and waterproof sheeting, if required to be fixed with the insulating boards, onto a sheet panel forming a cover plate for a flat roof, which can be easily released in order to facilitate repairs, renovations and the like, when required and without damaging the sheet panel.

The invention also has for an object the provision of a fixing device for such a detachable fixing assembly.

According to a further object the invention provides a fixing device which can be universally used for fixing insulating boards and possible additional waterproof sheeting of different thickness on a flat-roof cover plate of any thickness.

It is a further object of the present invention to provide such a fixing device which does not require a pre-drilled hole in the insulating boards waterproof sheetings if included, and the sheet panel and the cover plate.

SUMMARY OF THE INVENTION

With the foregoing objects in mind the invention provides in accordance with a first aspect a fixing assembly securing to a flat roof sheet panel an insulating board and waterproof sheeting if required to be fixed with the insulating boards, comprising sleeve means inserted into a drilled hole, extending through the waterproof sheeting, if present, the insulating board and the sheet panel, the sleeve means having a lower end portion projecting beyond the sheet panel and including an expandable member having an outside diameter which is expandable radially beyond the diameter of the drilled hole by compressing said part, a clamping bolt extending through a plate or disc-like element and the sleeve, the clamping bolt having a widened base constituting a head section engaging the lower end of the sleeve and an end section with an external thread, and a nut threaded onto the threaded end section and supported against the upper side of the plate or disc like abutment element the sleeve means at the upper end thereof being supported by the underside of this plate or disc-like element, and the expandable member being expanded by tightening the nut on the bolt.

According to a further aspect the invention provides a fixing device intended for use in a fixing assembly as just described, which fixing device comprises a bolt having a widened head section and an external thread on the end section; a one-piece or mult-piece sleeve, the length of which essentially corresponds to the length of the bolt between its end section and head section and through the bore of which the bolt can be passed; an annular, deformable expansion member; a plate-shaped or disc-shaped abutment element provided with a hole and intended for bearing against the uppermost insulating board or waterproof sheeting, the hole diameter of which element is larger than the external-thread diameter of the end section of the bolt and smaller than the outside diameter of the sleeve, and a nut or the like having an internal thread adapted to the external thread of the end section, with the head section of the bolt, the sleeve and the non-deformed expansion member essentially having the same outside diameter, and the bolt, the sleeve and the expansion member being arranged coaxially.

When opened-out the expansion member of the fixing device according to the present invention grips behind the sheet panel in the installed position and thus ensures a reliable and durable fixing for the insulating boards and possibly additional waterproof sheeting. Nevertheless this fixing can be detached again owing to the screw connection at the end section of the clamping bolt. Thus in the case of renovations, reconstructions, renewals and the like the layer of insulating material and possible waterproof sheeting can be removed from the sheet panel without damaging the latter to any considerable extent.

In a preferred embodiment the head section of the bolt can be made as a self-drilling tip or a self-drilling core. In this case, the complete fixing device can act as a drilling tool, so that preliminary drilling of the locating hole in a separate, initial operation is no longer necesary. The fixing device according to the present invention can be inserted with a conventional screw setting tool.

According to a further preferred feature, the sleeve can be made in several pieces and consist of a main sleeve section and one or more additional spacers or distance pieces which have the same bore diameter and the same outside diameter as the main sleeve section. With an appropriate number of distance pieces, the sleeve can be readily adapted to any wall thickness of the roof covering. Irrespective of the wall thickness of the roof covering, only a small number of basic elements are necessary consisting of a bolt, a main sleeve section and distance pieces, an expansion member, an element in the form, for example, of a washer, and a clamping nut. By adding an appropriate number of distance pieces, the fixing can be adapted in simple manner to the particular wall thickness of the roof covering. The complete fixing device according to the invention consists of individual parts which are simple to manufacture, and, in the installed position, guarantees reliable fixing of the insulating board(s) and possibly additionally provids waterproof sheeting(s) on the cover plate of a flat roof.

The expansion member provided according to the invention is a member which can be handled independently and has a bore through which the bolt serving as a clamping means can be guided. This permits various embodiments for the expansion member, which initially must be able to be guided through the drilled hole in the sheet panel and then - after the overall axial length of the expansion member is shortened - must assume such an outside diameter that it can no longer pass again through the drilled hole in the sheet panel. The expansion member preferably consists of elastically deformable material so that once the clamping action is released, the expansion member can essentially assume its original shape again with a reduced outside diameter which enables it to again pass through the drilled hole in the sheet panel. Such an elastically deformable expansion member facilitates repair and/or renovation work, during the course of which insulating boards already laid have to be removed again. When removing the fixing device, damage to the sheet panel can largely be avoided.

After the expansion member has opened out as intended, it forms an abutment for the bolt of the fixing device, which grips behind the sheet panel of the cover plate for the flat roof. The other opposite abutment is created by a plate-shaped or disc-shaped element which bears against the uppermost insulating board or waterproof sheeting possibly provided in addition. This element can be made, for example, in the form of a washer of comparatively large diameter. This element is provided with a preferably concentrically arranged bore, the diameter of which is larger than the external-thread diameter at the bolt end section and smaller than the outside diameter of the sleeve. Thus the sleeve can be supported in the installed position on the underside of the element, that is, the side facing towards the sheet panel. In addition, a clamping nut or the like is provided with an internal thread adapted to the external thread on the bolt end section. By screwing this nut onto the external thread on the bolt head section, the element is first pressed against the uppermost insulating board or waterproof sheeting, with the bolt being firmly end at the profiled head section if required. Tightening a clamping nut further shortens the axial length of the bolt section located inside the drilled hole. The single relatively easily deformable component of the fixing device, namely the annular expansion member, reacts to this shortening by becoming shorter in its overall axial length. The expansion connected with this in the outside diameter of the expanding body at least initially requires no frictional connection between the expansion member and the drilled hole and/or the sheet panel, so that the unloaded expanding body can have dimensions which enable it to pass easily through the drilled hole. Continued expansion finally results in a tight frictional connection of the expansion member in the drilled hole of the cover plate and/or in a positive connection on the underside of the sheet panel. This prevents the expansion member from passing again unintentionally through the drilled hole in the sheet panel and ensures reliable fixing of the insulating board(s) and possible additional waterproof sheeting(s) on the cover plate for the flat roof.

As already stated above, the head section of the bolt serving as a clamping means can preferably be made as a self-drilling tip or a self-drilling head. In such a case, a profiled portion for positively locating the bolt end section in the head of a conventional screw-setting tool is preferably located on the bolt end section - on or adjoining the external thread section. Thus the bolt equipped with a sleeve, an expansion member and distance pieces optionally provided can be used as a drilling tool which itself drills the hole required for insertion through the insulating board, possible waterproof sheeting, a possible cover plate and the sheet panel on the flat roof. Irrespective of the design of the bolt head section, such a profiled portion also enables the bolt to be initially held when the nut is being screwed on until the expansion member "grips".

In such a case, an anti-rotation seating can preferably be created on the bolt for the sleeve and the distance pieces optionally provided. Moreover, a thread can be cut on the outer periphery of the sleeve and the distance pieces. The resulting common rotation of drilling head, sleeve and optional distance pieces makes it easier for the fixing device to turn into and through the various materials of the roof covering.

Various embodiments can be provided for the expansion member, as described in greater detail below with reference to practical embodiments.

The invention is described in greater detail below with reference to preferred embodiments and to the drawings, in which:

BRIEF DESCRIPTION OF THE DRAWINGS

FIGS. 7a, 8a, 9a, 10a, 11a and 12a each show details of an embodiment of an expanding body in the non-clamped condition in the installed position on the bolt of a fixing device according to the present invention;

FIGS. 7b, 8b, 9b, 10b, 11b and 12b each show a plan view of the expansion member shown in FIGS. 7a, 8a, 9a, 10a, 11a and 12a respectively;

FIGS. 7c, 8c, 9c, 10c, 11c and 12c in each case show the expansion member shown in the associated FIGS. 7a, 8a, 9a, 10a, 11a and 12a respectively, but in the clamped condition;

FIGS. 8d, 9d, 10d, 11d and 12d each show a plan view of a modification of the expansion member shown in FIGS. 8b, 9b, 10b, 11b and 12b respectively.

DETAILED DESCRIPTION OF THE PREFERRED EMBODIMENT

The fixing device designated below generally as 1 is used for fixing one or more insulating boards and waterproof sheeting(s), to be fixed if necessary together with the insulating boards 1, on the sheet panel 2 of a cover plate of a flat roof. In the embodiment shown in FIGS. 1 and 2, the cover plate simply consists of a layer of insulating boards 3 which are fixed to a sheet panel 2 formed from flat and profiled sheets. Although not shown in FIGS. 1 and 2, waterproof sheeting which acts as a vapor barrier can be arranged on the underside of the insulation 3, and further water-proof sheeting which acts as a watertight skin can be arranged on the upper side of the insulation 3.

Figure 4:
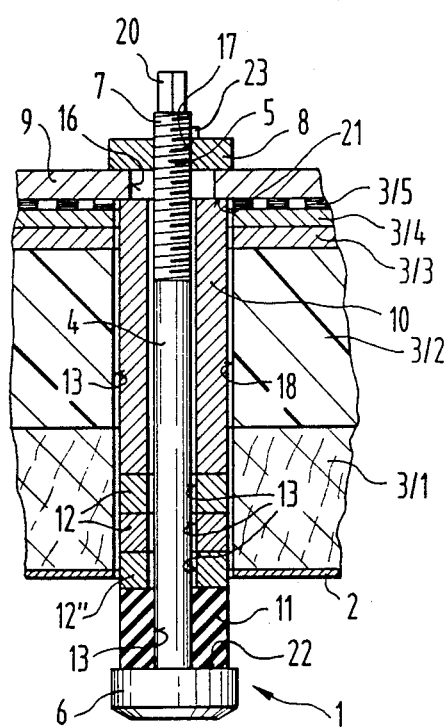
FIG. 4 shows a second embodiment of an inventive fixing of a multi-layer covering on the flat roof with an alternative, non-clamped fixing device.
Figure 5:
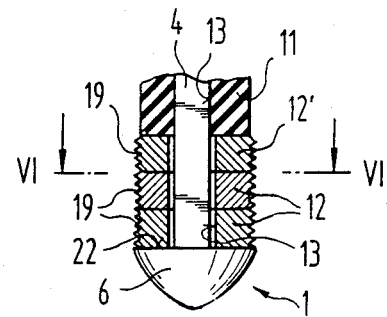
FIG. 5 shows the base section of a further embodiment of a fixing device according to the invention.
Figure 6:
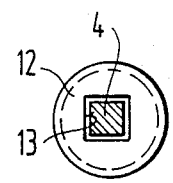
FIG. 6 shows a schematic cross-sectional representation of a section along section line VI-VI in FIG. 5.

Such an insulation 3 can be attached directly when the flat roof is being made or later as additional insulation for the sheet panel 2 of a cover plate. Alternatively, FIG. 4 shows the reconstruction of an old roof having multi-layer covering. The old roof shown consists of a sheet panel 2 of flat or profiled steel sheets, on top of which are provided panels 3/1 of wood, plastic or another material, on top of which an insulating layer 3/2 is provided and attached on top of the layer 3/2 old sealing layers 3/3 and 3/4, two layers of bituminous material. Located on the top of the above layers is waterproof sheeting 3/5 which acts as a watertight roof skin and is fixed to the sheet panel 2 by means of a fixing device 1.

Figure 2:
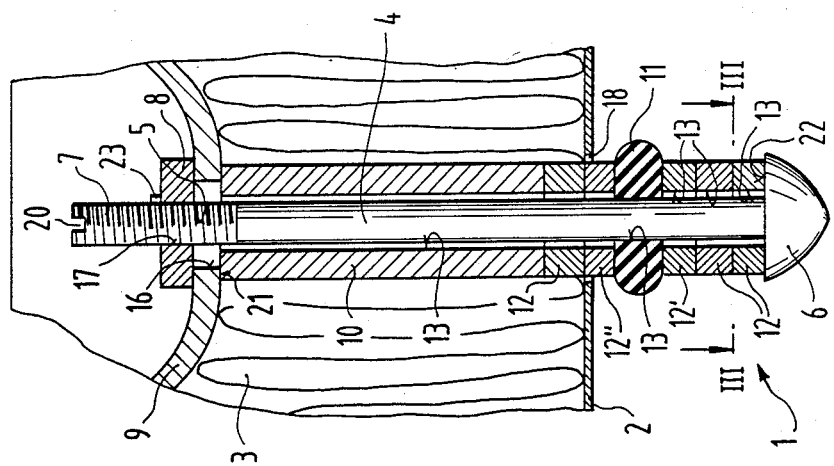
FIG. 2 shows the fixing according to FIG. 1, but with a clamped fixing device.
Figure 1:
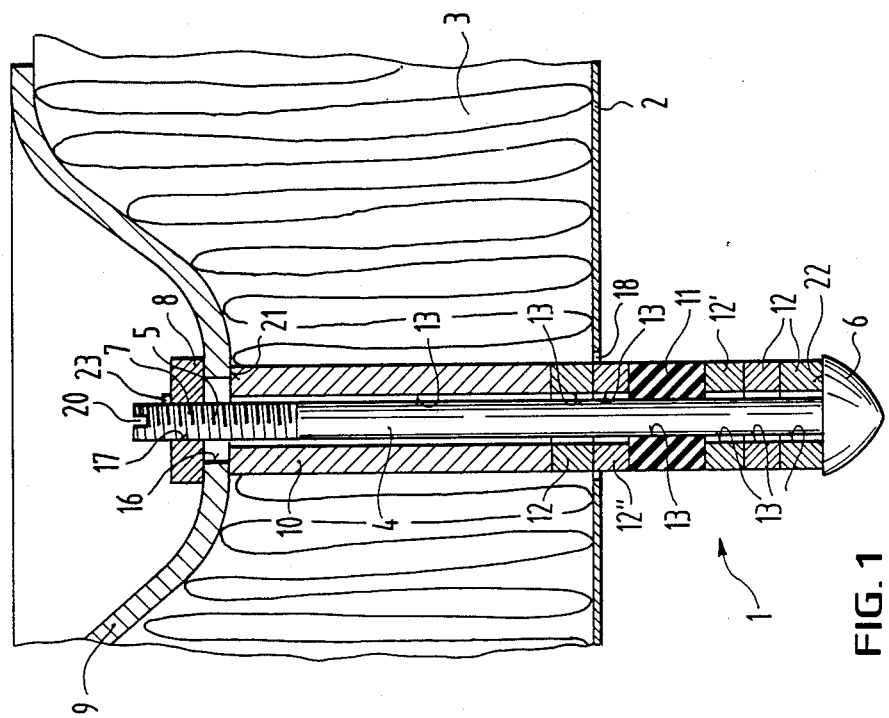
FIG. 1 shows a first embodiment of a fixing device according to the invention for an insulating board on the flat roof, with a non-clamped fixing device.
Figure 3:
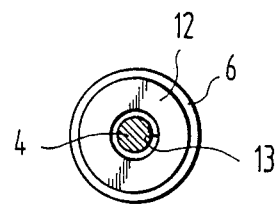
FIG. 3 shows a schematic cross-sectional view taken along section line III-III in FIG. 2.

Without being limited to them, FIGS. 1, 2 and 4 illustrate various applications of the fixing device, in which it becomes clear that the wall thickness of the covering, given by the thickness of the thermal insulation 3, possible waterproof sheeting 3/5 and also by the thickness of possible cover panels 3/1, 3/2, 3/3 and 3/4, can vary considerably and can, for example, range between 5 and 20 cm. The fixing device described in detail below is advantageously suited to all of these applications.

A bolt 4 having a widened head section 6 and an external thread 7 on the end section 5 forms part of the fixing device 1. A sleeve 10, an expansion member 11 and if necessary one or more distance pieces 12, 12' and 12", each of which has a drilled through hole 13, also form part of the fixing device 1. The bolt 4 is guided through the drilled through bores 13 in the distance pieces 12, 12' and 12", the expansion member 11 and the sleeve 10, which drilled through bores 13 are in alignment with one another.

In addition, a plate-shaped or disc-shaped abutment element 9 is provided which has a drilled hole 16 and is intended for seating on the uppermost insulating board 3 or waterproof sheeting 3/5, the drilled-hole diameter of element 9 being larger than the external thread diameter on the bolt end section 5 and smaller than the outside diameter of the sleeve; moreover, a clamping nut 8 or the like is present which has an internal thread 17 adapted to the external thread 7 on the bolt end section 5. In the installed position, the nut 8 screwed onto the external thread 7 on the bolt 4 is supported on the upper side of the element 9. Furthermore, the head section of the sleeve is supported on the underside of this element 9. The element 9 can be, for example, a washer of non-corroding metal or plastic which has a comparatively large diameter. Once the fixing is complete, known sealing means can be put on the element 9 and on the protruding parts of the bolt 4 and on the nut 8.

The fixing device 1 can be of self-drilling or non-self-drilling design. FIGS. 1,2,3,5 and 6 show self-drilling embodiments. In this case, the enlarged head section 6 on the bolt 4 is designed as a drilling tip, in particular a self-drilling tip, or as a drilling head. With the bolt 4 whose head section 6 is designed as a drilling core or drilling tip, a drilled through hole 18 can be made in the covering material 3 or 3/5, a possible cover plate, and the sheet panel 2. FIG. 4 shows a non-self-tapping embodiment of the fixing device 1; a drilled through hole 18 which passes through the insulation 3, possible waterproof sheeting 3/5 and the sheet panel 2 has to be made by a separate drilling tool before the fixing device is set. In this case, the diameter of the bolt head section 6 is slightly smaller than the diameter of the drilled through hole 18. In the case of the self-drilling embodiment of the fixing device 1, the diameter of the drilled hole 18 corresponds to that of the bolt head section 6 provided with a drilling tip or designed as a drilling head. Irrespective of the design of the bolt section 6, the outside diameter of the sleeve 10, the unloaded expansion member 11 and possible distance pieces 12, 12' and 12" is mostly slightly smaller than the diameter of the bolt base section 6. In an alternative embodiment, see FIGS. 5 and 6, those distance pieces 12 and 12' which are arranged between the expansion member 11 and the bolt head section 6 designed as a drilling tip or drilling head can have the same outside diameter as the drilling tip or the drilling core. In addition, a thread 19 can be cut on the outer periphery of these distance pieces 12 and 12' and if necessary also on the sleeve (not shown). Such a fixing device 1 is especially advantageous for reconstructing old roofs, in which multi-layered insulation of the old roof, for example of the type shown in FIG. 4, has to be drilled through. In this case, the threads 19 arranged on the outside on the distance pieces 12 and 12' and if necessary on the sleeve 10 help the fixing device 1 to be fed through the covering layer of the old roof. The distance pieces 12 and if necessary also the sleeve section sit with adapted drilled through holes 13 in positively locked manner on the bolt 4 which here, above the head section 6, has a continuously smooth shank section with a cross-section differing from the circular shape in particular a square cross-section, see FIGS. 5 and 6.

Alternatively, the bolt 4 - as shown in the other Figures - has a shank section with a continuously circular-cylindrical cross-section above the head section 6. The bolt end section 5 provided with an external thread 7 preferably has the same outside diameter as the smooth shank section of the bolt. The bolt 4 is preferably made of solid steel.

The sleeve 10 and each of the distance pieces 12, 12' and 12" used each have an identical annular cross-section over the entire length, apart from any chamfers. Both the sleeve 10 and the distance pieces 12, 12' and 12" possibly used, can be made of a plastic which is of greater rigidity than the material of the expansion member. In this case, special protection against corrosion for the bolt 4 is not necessary. Alternatively, the sleeve 10 and the distance pieces 12 can be made of metal. At the end of its end section 5 bearing the external thread 7, the bolt 4 can have means 20, for example in the form of a cross slot, a square, a hexagon or the like, in order to positively locate the end of the fixing device 1 in a setting tool and/or to make it easier to hold the bolt 4 when the nut 8 is first being screwed on.

As can be seen from FIGS. 1 and 4, the individual parts of the fixing device 1, in the non-clamped condition, assume a position described below. The clamping nut 8 is supported on the upper side of the element 9 and is screwed over the external thread 7 onto the bolt to the extent that all other parts, namely the sleeve 10, the expansion member 11 and any possible distance piece 12, 12' and 12" are clamped and bear against one another between the two abutments, namely on the one hand the bearing surface 21 on the underside of the element 9 and on the other hand the bearing surface 22 on the bolt base section 6, without deforming the expanding body 11. In this non-deformed condition, the deformable expanding body 11 has an outside diameter which at maximum corresponds to the diameter of the diameter of the drilled through hole 18 provided in the cover plate, in particular in the sheet panel 2. This ensures that the interfitting fixing device 1 can readily pass through a drilled through hole 18 made beforehand. Provided the fixing device 1 is of self-drilling design, the drilling operation is not impaired by any of the parts 10, 11, 12, 12' and 12" sitting on the bolt 4.

The plate-shaped or disc-shaped abutment element 9, through the drilled hole 16 of which the bolt end section 5 passes, bears against the upper side of the uppermost insulating board 3 or waterproof sheeting 3/5. As can be seen from FIGS. 1 or 4, the sleeve 10 is supported directly or if necessary indirectly via one or more distance pieces 12 against the underside of the element, which faces towards the roof covering. The expansion member 11 is made deformable. Tightening the clamping nut 8 causes the element 9 and the bolt head section 6 to move towards one another, which leads to axial compression and simultaneous radial widening of the expansion member 11 until its diameter is larger than the diameter of the drilled through hole 18 in the sheet panel. This operation takes place during assembly of the fixing device, after it has been completely guided through the drilled through hole 18, at a slight distance beneath the sheet panel 2 of the flat roof in the space available there. This space can be a free space or a continuation of the drilled through hole 18 in the understructure of the flat roof. After such an operation, the insulation and possible additional waterproof sheeting are firmly connected to the sheet panel of the cover plate, and the fixing device 1 is held in the installed position through the expansion member 11. To prevent unintentional detachment of this fixing, the clamping nut 8 can be prevented from becoming loose by securing it with a suitable locking element 23 at the bolt 4.

There are various ways of realizing the expansion member 11, some of which are shown in the Figures. The expansion member shown in FIGS. 1 and 4 is an annular molding body of elastically or plastically deformable, non-corroding and non-aging material. This material can be, for example, rubber, a rubber compound or a certain standardized plastic. The expansion member 11 which is shown unloaded in FIG. 1 assumes the opened-out shape which can be seen from FIG. 2 as a result of the compression of the two components adjoining on the upper side and the under side, which on the upper side can be the sleeve 10 or a distance piece 12" and the under side can be the bolt head section 6 or a further distance piece 12'.

The expansion member 11 shown in FIG. 7a can likewise be made of deformable, natural or synthetic rubber or a suitable plastic and has rounded-off corner areas and a smaller depth. FIG. 7b shows this expansion member 11 in plan view and FIG. 7c shows it in the deformed, opened-out condition.

The expansion member 11 shown in FIG. 8a forms a circular disc 24 which, on its upper side, has an acuteangled lip ring 25 all round on the outside. During the clamping operation, this lip ring 25, as can be seen from FIG. 8c, can be pressed radially outwards by a tapered chamfer 26 on the component bearing against it, namely the sleeve 10 or a distance piece 12".

Figure 9C:
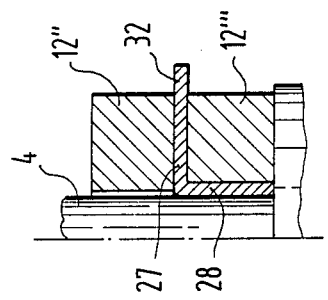
Figure 9D:
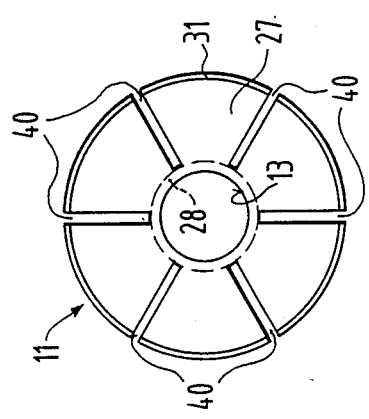
Figure 9B:
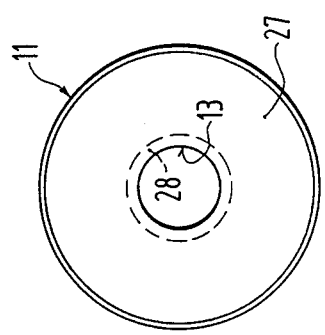
Figure 9A:
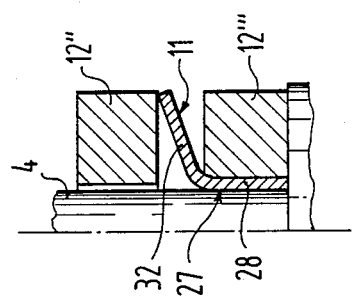

The expansion member 11 shown in cross-section in FIG. 9a and in plan view in FIG. 9b is an annular, angled profiled piece 27 with a hollow-cylinder section 28 gripping around the bolt 4 and a widening funnel section 32 integrally formed on the hollow-cylinder section 28, with the hollow-cylinder section being enclosed in the installed position by an adapted distance piece 12''' and the funnel section 32 being located in the gap between two adjacent distance pieces 12" and 12''' or the like arranged at a distance from one another. When the fixing device 1 is being tightened, the funnel section 32 of the profiled piece 27, by the narrowing of the gap between the components adjoining on the upper side and under side, is deformed into a flat flange which is then vertically aligned to the bolt axis and the periphery of which projects beyond the outer periphery of the distance pieces 12' and 12''', as can be seen from FIG. 9c.

Figure 10C:
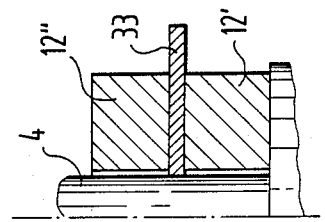
Figure 10D:
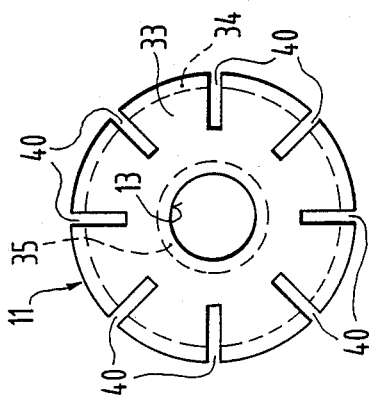
Figure 10B:
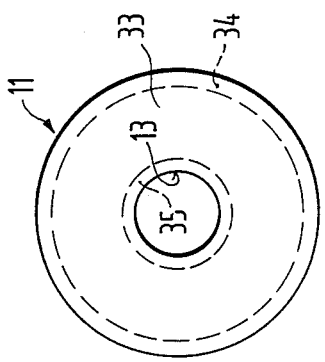
Figure 10A:
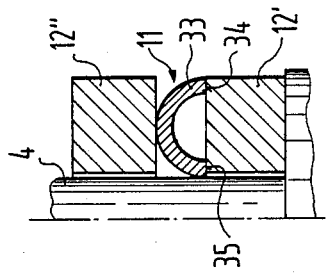

The expansion member 11 shown in cross-section in FIGS. 10a and 12a and in plan view in FIGS. 10b and 12b is an annular profiled piece 33 which is curved in radial section, in particular in the shape of a circle sector or preferably in a semicircular shape, and in the installed position surrounds the bolt 4 and is located in the gap between two adjacent distance pieces 12' and 12" or the like arranged at a distance from one another.

During the clamping operation, the profiled piece 33 curved beforehand is deformed by the narrowing of the gap into a flat disc which then projects radially beyond the periphery of the distance pieces 12' and 12", as can be seen from FIGS. 10c and 12c.

The expansion member 11 shown in cross-section in FIG. 11a and in plan view in FIG. 11b is an annular profiled piece 36 which in radial section is curved in the shape of a circle sector and has a radial section 39 and a curved section 38. This profiled piece 36, with the annular end face 37 on the curved section 38, bears against a component 12" (sleeve or distance piece) and, with the radial section 39, bears against the other adjacent component 12' distance piece or bolt head section arranged at a distance. By the narrowing of the gap between these two components 12' and 12" when the fixing device 1 is being clamped, the profiled piece 36 curved beforehand is deformed into a flat disc which then protrudes radially, as can be seen from FIG. 11c.

Each of the expansion member 11 shown in FIGS. 8 to 12 can be made of a deformable metal or plastic material. In particular when such an expansion member is made of metal, it can be expedient to provide radial recesses 40 from the outer edge region in the area to be deformed which facilitate the desired change in shape to a flat disc. The arrangement and number of recesses can be seen in each case from FIGS. 8d, 9d, 10d, 11d or 12d.

As already indicated, an important advantage of a preferred embodiment of the fixing device according to the invention is that the fixing device can be adapted to a considerable extent to different thicknesses of roof covering. Such an adaptation is effected by attaching a corresponding number of distance pieces 12, 12' and 12" on the bolt 4. Not only can the cover plate of a flat roof be of different thickness from case to case, it can also have insulation of different thickness. It has been shown in practice that three different bolts with otherwise identical expansion member, sleeves, distance pieces, nuts and plate-shaped elements are completely adequate for adapting to these various thicknesses of roof covering. These different bolts differ only in their length, with the length of such a bolt approximately corresponding to 1.2 to 1.5 times the wall thickness of the particular roof covering.

What is claimed is:

1. A fixing device for securing at least one insulating board onto a flat roof panel including a sheet metal plate, said fixing device comprising:
    a bolt having an enlarged head portion, an externally threaded end portion and a shaft portion extending therebetween;
    said end portion being provided with a profiled part for facilitating holding of said bolt;
    a sleeve means inserted on said shaft portion, said sleeve having a first end and a second end, and a length shorter than the length of said shaft portion;
    an annular deformable expansion member insertable onto said shaft portion between said first end of said sleeve and said enlarged head portion;
    said sleeve means and said expansion member in a non-deformed state having an outer diameter smaller than the diameter of said head portion;
    a plate-like abutment member inserted over said end portion to be supported on the upper surface of the uppermost insulating board said abutment member including a through hole having a diameter larger than the diameter of said end portion and smaller than the outer diameter of said sleeve; and
    a nut provided with an internal thread to be screwed on said externally threaded end portion,
    said bolt with sleeve and said expansion member provided thereon being inserted into a bore which extends through said insulating boards and said sheet metal plate, which is located underneath said boards such that said expansion member is positioned under said sheet metal plate, entirely outside said bore, said end portion extending through said hole in said abutment member and said second end of said sleeve contacting said abutment member;
    wherein screwing said nut member on said threaded end portion while simultaneously hindering any rotation of said bolt by holding said profiled part, causes a radial expansion of said expansion member to a deformed state in which said outer diameter of said expansion member is larger than the diameter of said bore, and wherein securing of said at least one insulating board to said sheet metal plate is effected by an axial interlocking between said sheet metal plate and said radially expanded deformed expansion member externally of said bore.

2. A fixing device according to claim 1 wherein said sleeve means includes a main sleeve section and at least one sleeve distance piece.

3. A fixing device according to claim 2, wherein said expansion member is a separate annular member inserted between two sleeve distance pieces, said sleeve distance pieces being supported by said main sleeve section and said head portion of said bolt, respectively.

4. A fixing device according to claim 1 wherein said head portion of said bolt is in form of a self-drilling tip or head.

5. A fixing device according to claim 4, wherein said bolt has a non-circular cross-section over at least a considerable portion of the length thereof extending from said head portion, and said sleeve means has a bore with a cross-section corresponding to the cross-section of the bolt so that the sleeve means rotates with the bolt when the latter is turned.

6. A fixing device according to claim 5, wherein a thread is provided on the outer surface of the sleeve.

7. A fixing device according to claim 1 wherein said sleeve means is made of a plastic material having greater rigidity than said expansion member.

8. A fixing device according to claim 1 wherein said bolt is made of steel.

9. A fixing device according to claim 1 wherein said expansion member is an annular disc with an integrally formed, acute-angled ridge extending around the outer edge thereof, said ridge being adapted to be pressed radially outwards during the clamping action by cooperation of the ridge with a chamfer on an adjacent end surface of said sleeve means.

10. A fixing device according to claim 1 wherein said annular expansion member has a cylindrical section for gripping around said bolt and a widening funnel section, integrally formed on said cylindrical section, the cylindrical section being adapted to be positioned within a section of the sleeve means with the funnel section being located in a gap between two adjacent sections of the sleeve means.

11. A fixing device according to claim 1 wherein said annular expansion member is curved in radial section, and is adapted to be located in a gap between two adjacent sections of said sleeve means.

12. A fixing device according to claim 9 wherein said annular expansion member is made of a deformable metal or plastic material.

13. A fixing device according to claim 9 wherein said annular expansion member has radial recesses extending inwardly from the outer periphery thereof.

14. A fixing device according to claim 11 wherein said annular expansion member is made of a deformable metal or plastic material.

15. A fixing device according to claim 10 wherein said annular expansion member has radial recesses extending inwardly from the outer periphery thereof.

16. A fixing device according to claim 11 wherein said annular expansion member has radial recesses extending inwardly from the outer periphery thereof.

17. A fixing device according to claim 11 wherein annular expanding body has radial recesses extending inwardly from the outer periphery thereof.

* * * * *